United States Patent [19]

Ohyama et al.

[11] Patent Number: 4,737,008
[45] Date of Patent: Apr. 12, 1988

[54] OPTICAL TRANSMITTING AND/OR RECEIVING MODULE

[75] Inventors: Sadahiro Ohyama, Chigasaki; Noriaki Sekine, Atsugi; Noribumi Ishi, Ibaraki; Toshio Takeuchi, Zama; Hideji Matsuura, Atsugi; Masatoshi Watanabe, Atsugi; Jiro Nakano, Atsugi, all of Japan

[73] Assignee: Mitsumi Electric Co., Ltd., Japan

[21] Appl. No.: 781,765

[22] Filed: Sep. 30, 1985

[30] Foreign Application Priority Data

Oct. 1, 1984 [JP] Japan .................. 59-148762[U]
Oct. 1, 1984 [JP] Japan .................. 59-148763[U]
Dec. 19, 1984 [JP] Japan .................. 59-192609[U]
Dec. 19, 1984 [JP] Japan .................. 59-192610[U]

[51] Int. Cl.⁴ ............................................. G02B 5/14
[52] U.S. Cl. ............................ 350/96.20; 350/96.18
[58] Field of Search ............ 350/96.15, 96.18, 96.20; 455/606, 607, 612

[56] References Cited

U.S. PATENT DOCUMENTS 4,186,996  2/1980  Bowen et al. ............... 350/96.2
4,547,039  10/1985  Caron et al. ................ 350/96.2

FOREIGN PATENT DOCUMENTS 40-13952  5/1940  Japan .
50-35263  10/1975  Japan .
59-60610  4/1984  Japan .
1180229  2/1970  United Kingdom .

OTHER PUBLICATIONS

Sugita, Minoru, "Ichigime Gijutsu (Positioning Technology)", *Nikkan Kogyo Shinbunsha*, 10-31-70, pp. 28-29.

Primary Examiner—Eugene R. LaRoche
Assistant Examiner—Steven J. Mottola
Attorney, Agent, or Firm—Andrus, Sceales, Starke & Sawall

[57] ABSTRACT

An optical transmitting and/or receiving module comprises an optical plug comprising a housing which is provided with at least one ferrule assembly having an optical fiber therein, a main receptacle body connected to the optical plug, and an optical link assembly comprising a substrate. The substrate has at least one optical semiconductor element and circuit elements for signal processing fixed thereon. The optical link assembly is fixed to the main receptacle body so that the at least one optical semiconductor element opposes a tip end of the optical fiber of the optical plug and a surface of the substrate is perpendicular to an optical axis of the optical fiber.

7 Claims, 12 Drawing Sheets

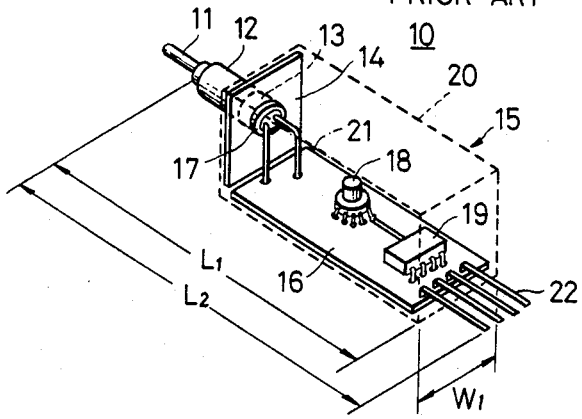
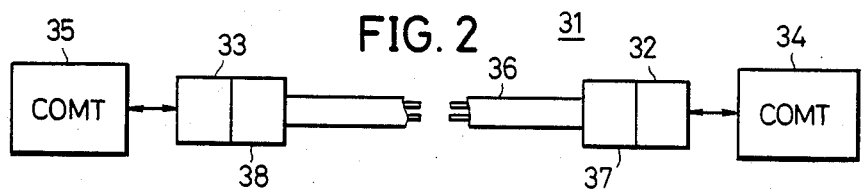
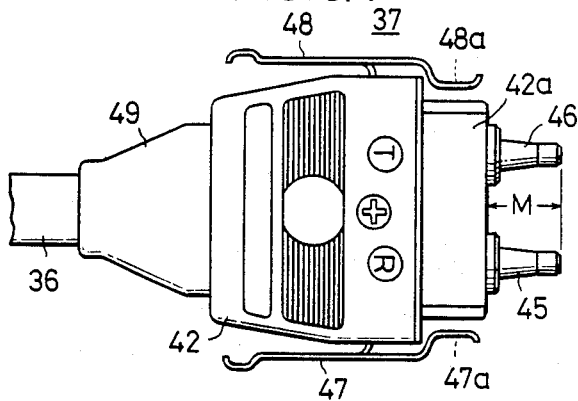
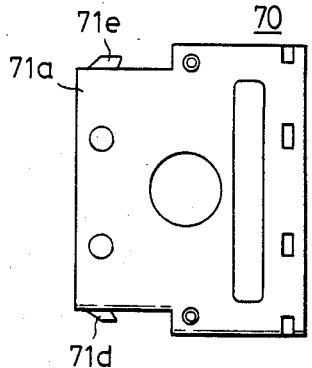
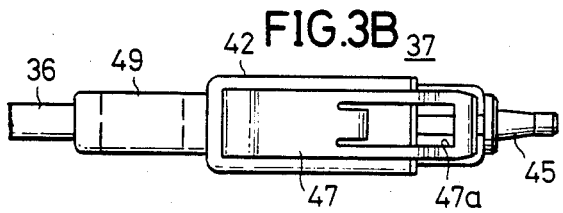
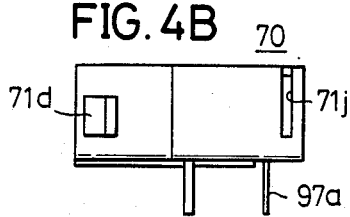

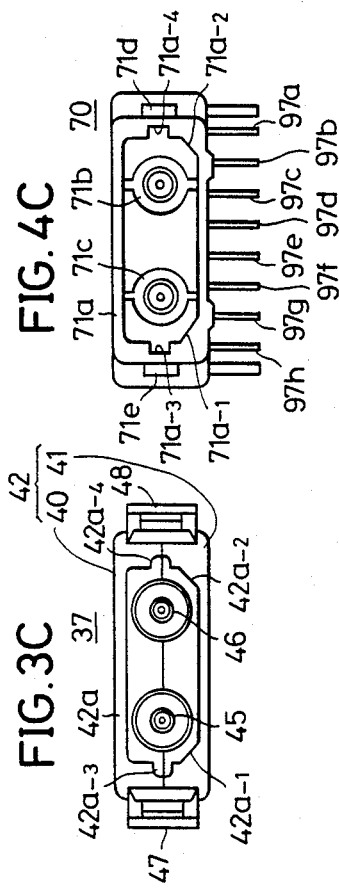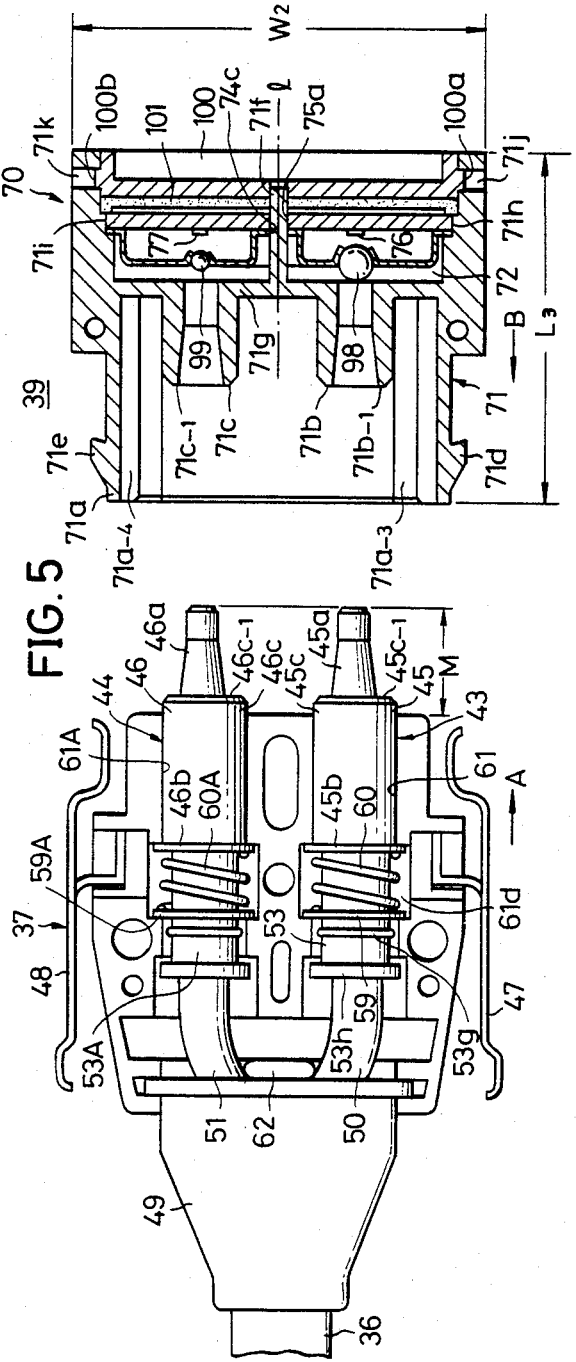

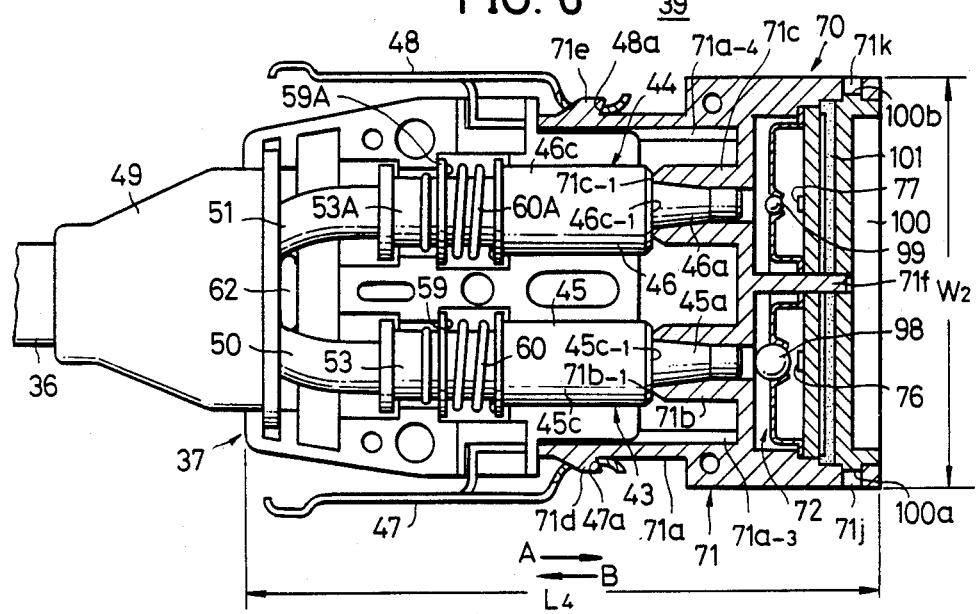
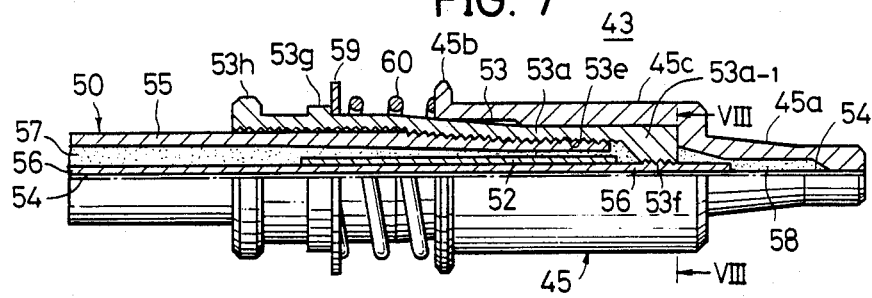
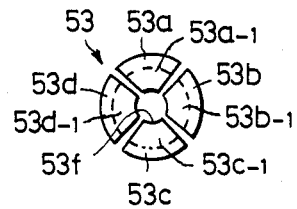

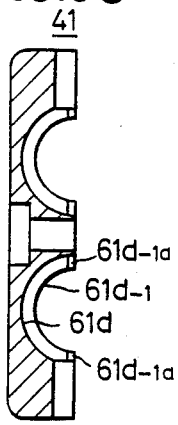
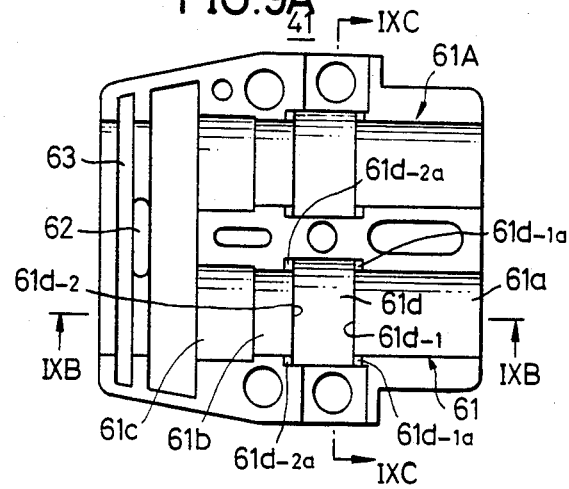
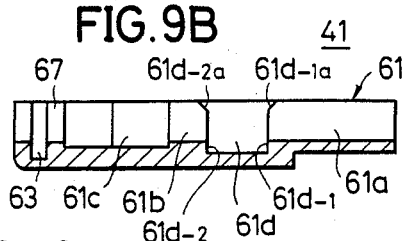
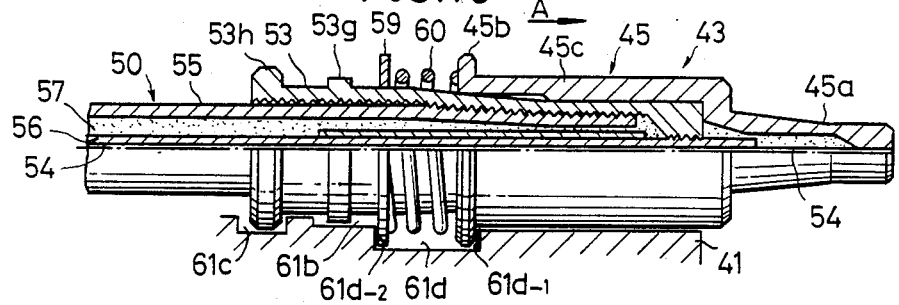
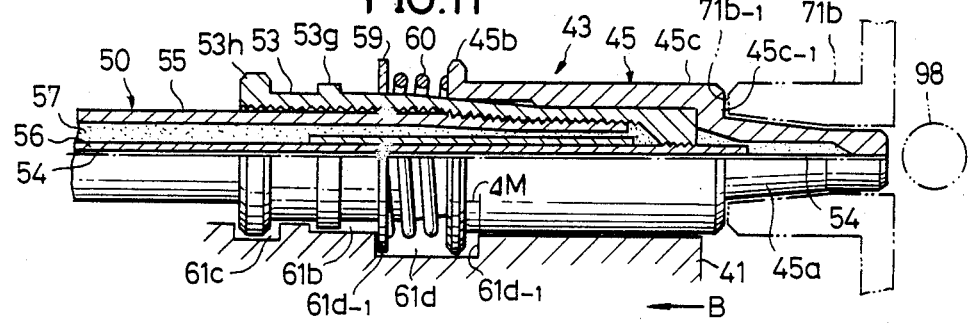

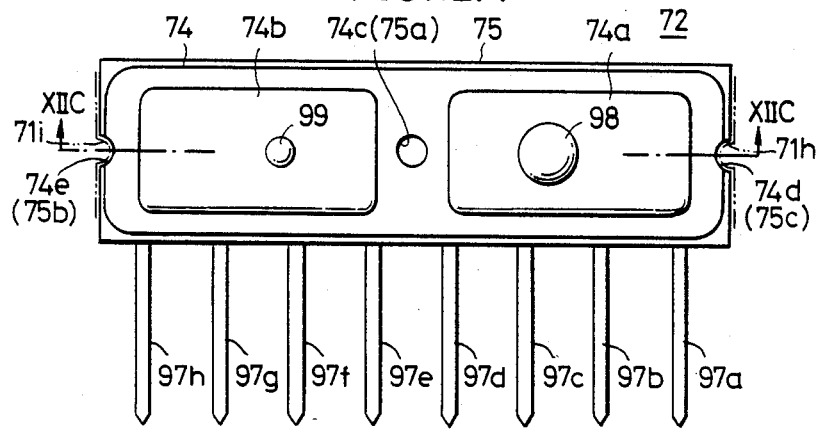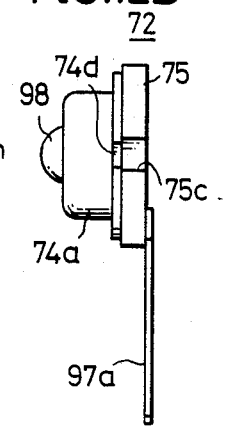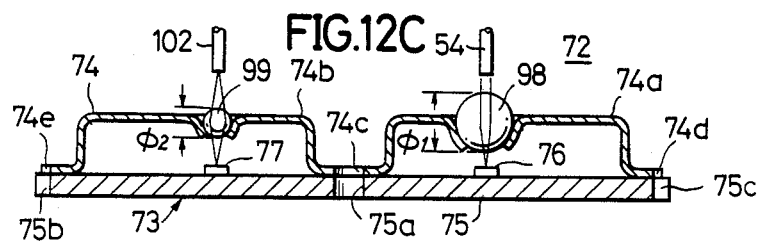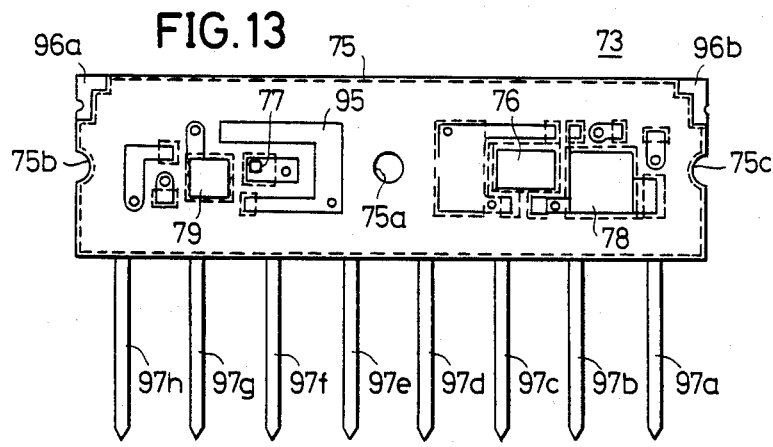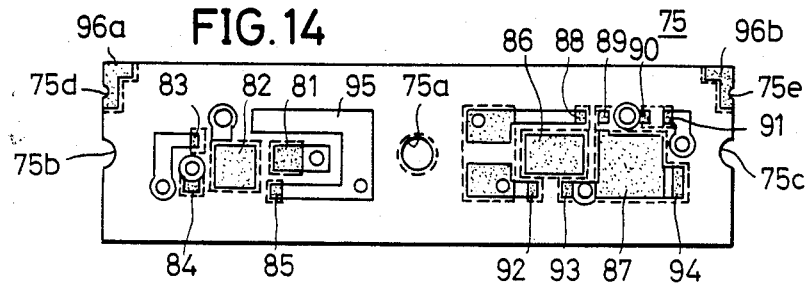

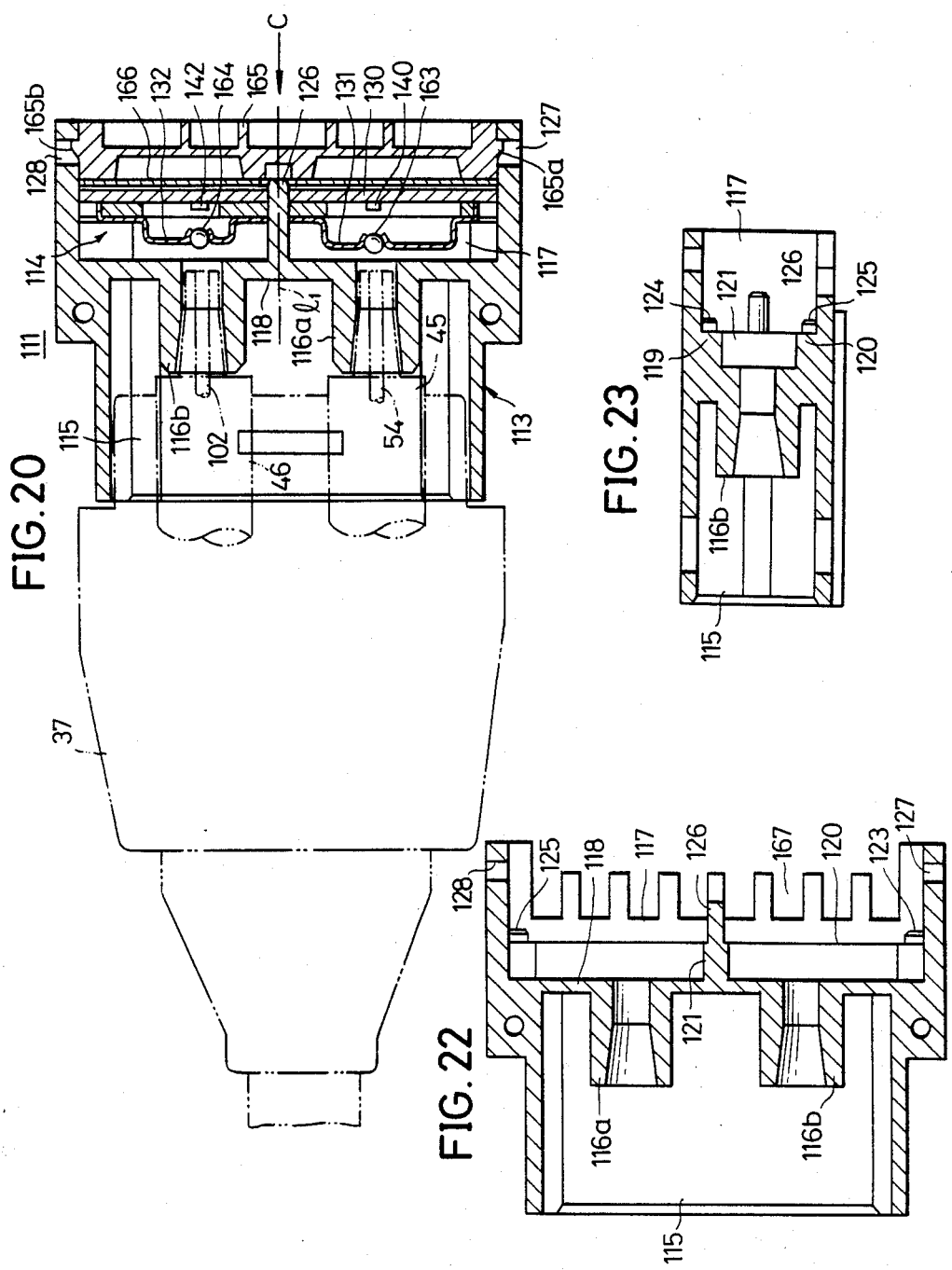

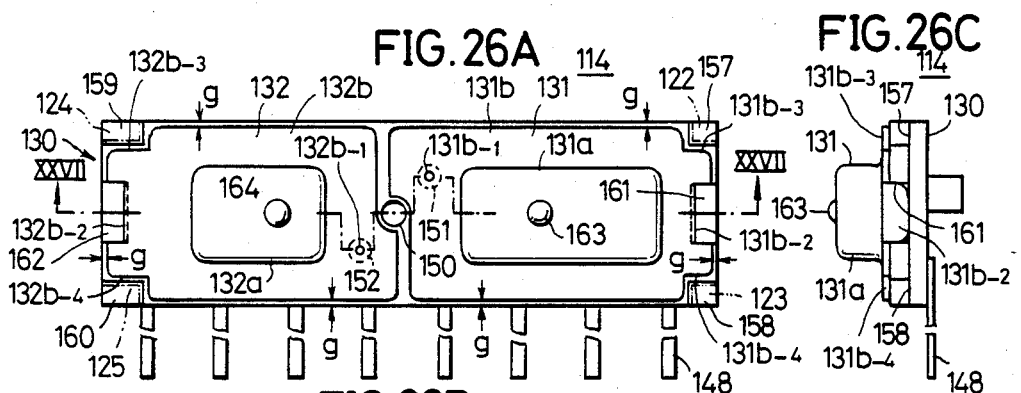
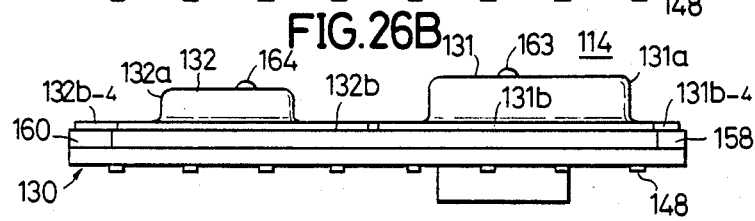
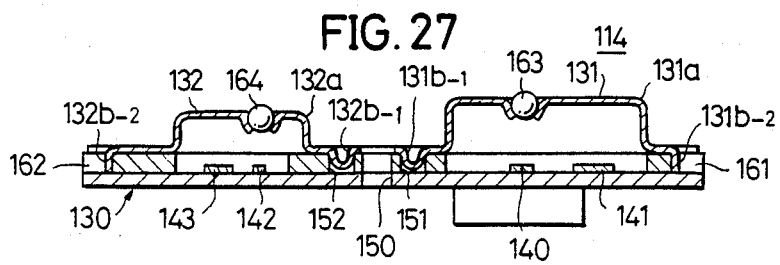
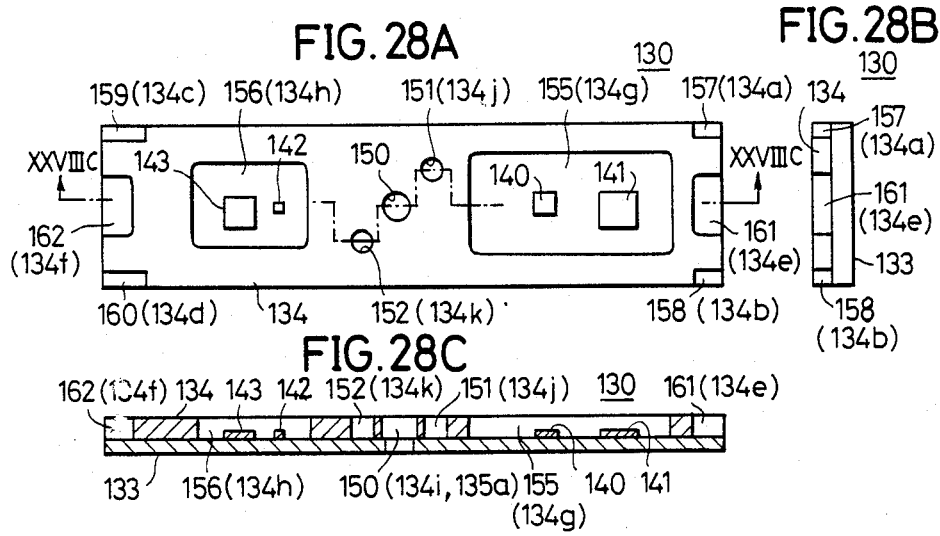

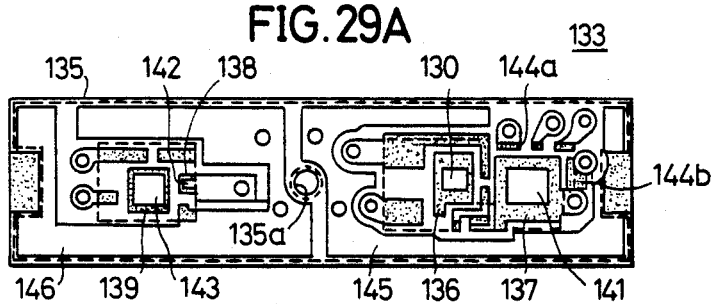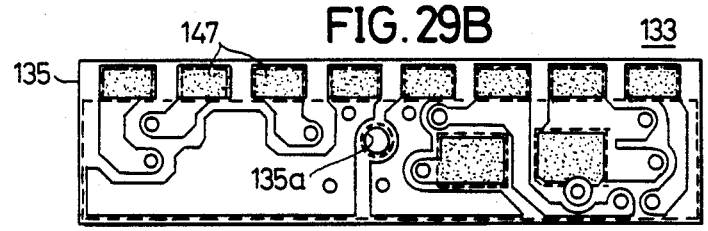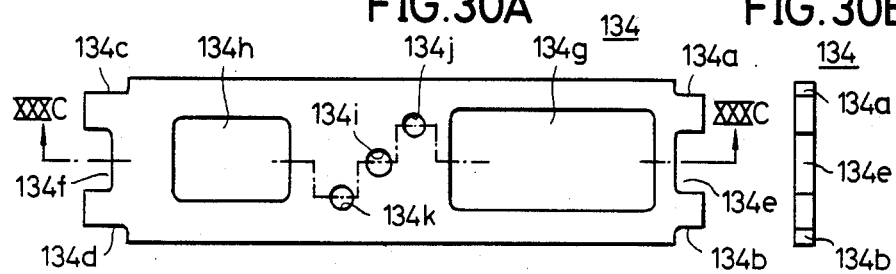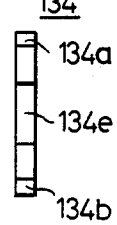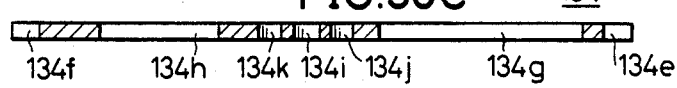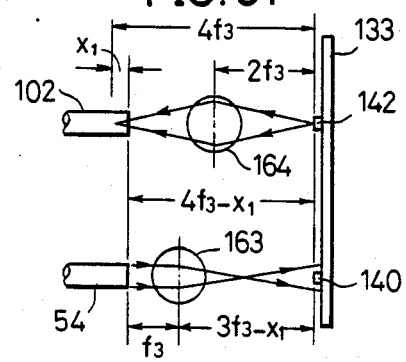

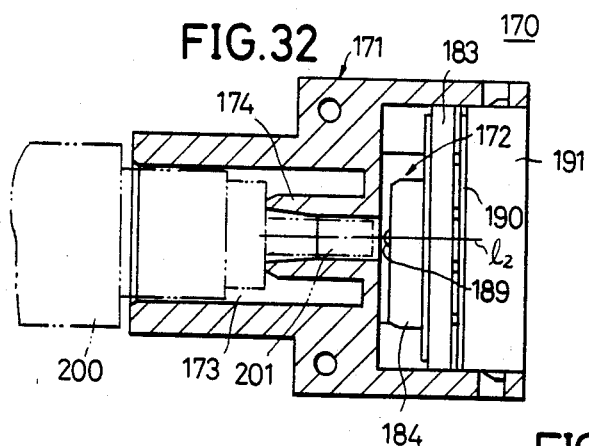
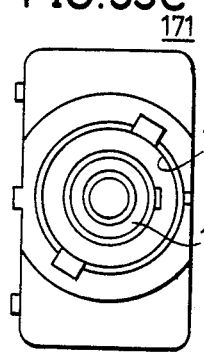
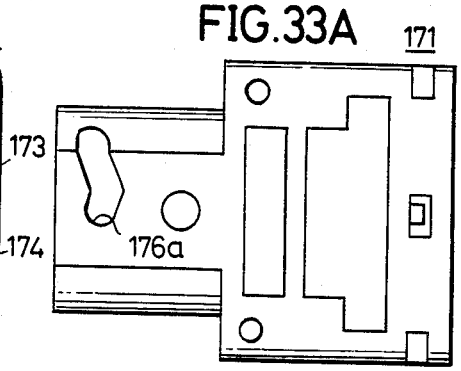
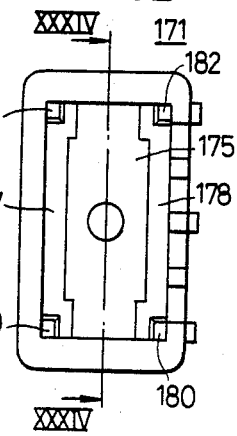
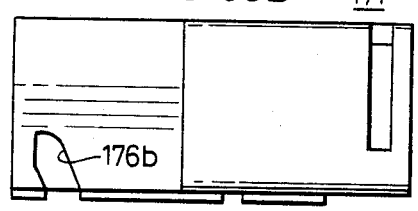
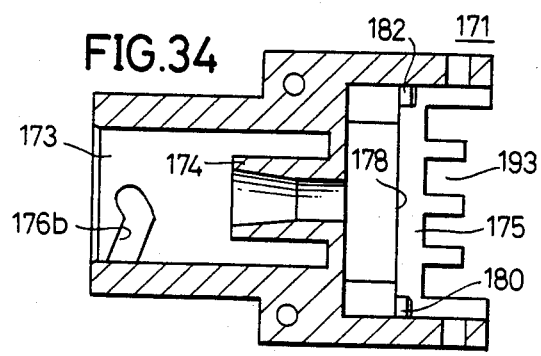

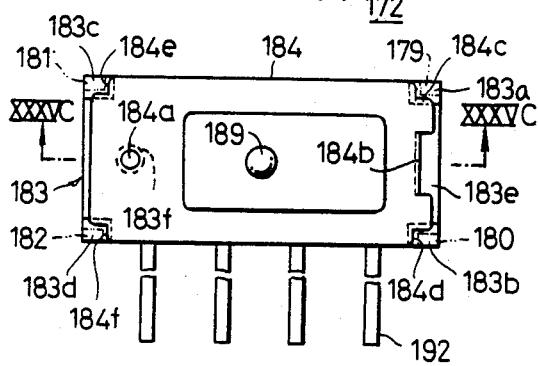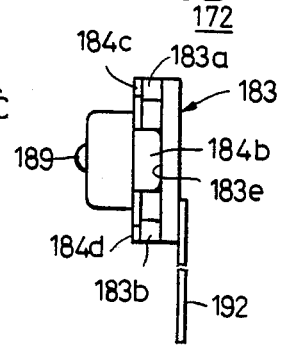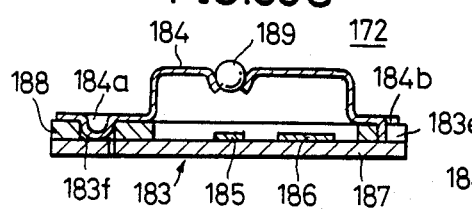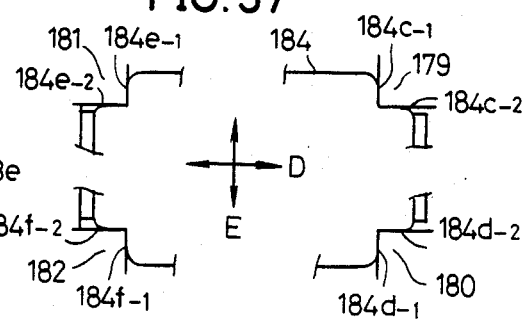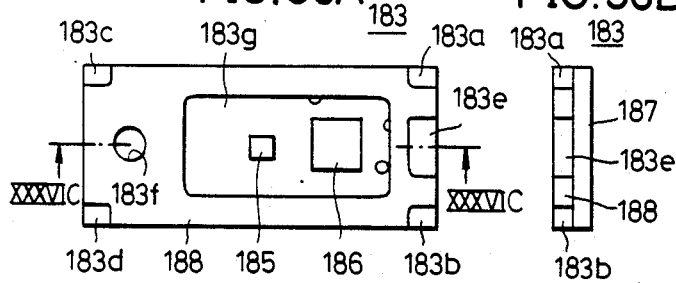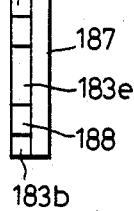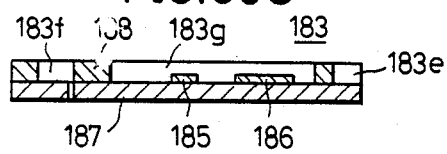

OPTICAL TRANSMITTING AND/OR RECEIVING MODULE

BACKGROUND OF THE INVENTION

The present invention generally relates to optical transmitting and/or receiving modules, and more particularly to a compact optical transmitting and/or receiving module.

Generally, an optical transmitting and/or receiving module refers to a unit comprising an optical connector, optical semiconductor elements, and a signal processing circuit such as an integrated circuit for electrically processing signals. The optical connector comprises an optical plug provided on an end of an optical fiber cable, and a receptacle to which the optical plug is detachably connected. The optical semiconductor elements and the signal processing circuit form a sub-unit, and such a sub-unit will hereinafter be referred to as an optical link assembly.

A conventional optical link assembly has a rectangular parallelopiped shape of a relatively large size, as will be described later on in the specification. For this reason, the overall size of the optical transmitting and/or receiving module is large, and it is difficult to downsize the optical transmitting and/or receiving module.

SUMMARY OF THE INVENTION

Accordingly, it is a general object of the present invention to provide a novel and useful optical transmitting and/or receiving module in which the problems described heretofore are eliminated.

Another and more specific object of the present invention is to provide an optical transmitting and/or receiving module comprising an optical link assembly and a main receptacle body, wherein the optical link assembly comprises a substrate having at least one optical semiconductor element and circuit elements of a signal processing circuit mounted thereon and the optical link assembly is mounted on the main receptable body so that a surface of the substrate is perpendicular to an axial direction of the main receptacle body. In other words, the surface of the substrate is perpendicular to an optical axis of an optical fiber within an optical plug which is connected to the main receptacle body. According to the optical transmitting and/or receiving module of the present invention, the optical link assembly is downsized, and the optical link assembly does not project from the main receptacle body. As a result, the overall size of the optical transmitting and/or receiving module can be reduced.

Other objects and further features of the present invention will be apparent from the following detailed description when read in conjunction with the accompanying drawings.

BRIEF DESCRIPTION OF THE DRAWINGS

FIG. 1 is a perspective view generally showing an example of a conventional optical receiving module;

FIG. 2 generally shows the constitution of a two-way transmission system applied with the optical transmitting and/or receiving module according to the present invention;

FIGS. 3A, 3B and 3C are a plan view, a side view, and a front view respectively showing an optical plug which constitutes a part of an embodiment of the optical transmitting and/or receiving module according to the present invention;

FIGS. 4A, 4B and 4C are a plan view, a side view, and a front view respectively showing a receptacle assembly which constitutes a part of the embodiment of the optical transmitting and/or receiving module according to the present invention;

FIG. 5 shows the embodiment of the optical transmitting and/or receiving module according to the present invention in correspondence with the optical plug having an upper housing therof removed and the receptable assembly shown in cross section;

FIG. 6 shows the embodiment of the optical transmitting and/or receiving module according to the present invention in a state where the optical plug is connected to the receptacle assembly;

FIG. 7 shows a view in cross section showing the construction of a ferrule assembly;

FIG. 8 is a view along a line VIII—VIII in FIG. 7 showing the construction of a holder;

FIG. 9A is a plan view showing a lower housing of the optical plug;

FIGS. 9B and 9C are views in cross section showing the lower housing of the optical plug along lines IXB—IXB and IXC—IXC in FIG. 9A, respectively;

FIG. 10 shows the ferrule assembly built within the lower housing of the optical plug;

FIG. 11 shows the ferrule assembly within the lower housing of the optical plug in a state where the optical plug is connected to the receptacle assembly;

FIGS. 12A and 12B are a front view and a side view respectively showing an optical link assembly built within a main receptacle body;

FIG. 12C is a view in cross section showing the optical link assembly along a line XIIC—XIIC in FIG. 12A;

FIG. 13 is a front view showing a substrate assembly which constitutes the optical link assembly;

FIG. 14 is a front view showing a substrate;

FIG. 20 is a view in cross section showing a modification of the receptacle assembly;

FIG. 22 is a view in cross section showing the main receptacle body along a line XXII—XXII in FIG. 21B;

FIGS. 23 and 24 are views in cross section showing the main receptacle body along lines XXIII—XXIII and XXIV—XXIV in FIG. 21A, respectively;

FIGS. 26A, 26B and 26C are a front view, a bottom view, and a side view respectively showing an optical link assembly shown in FIG. 20;

FIG. 27 is a view in cross section showing the optical link assembly along a line XXVII—XXVII in FIG. 26A;

FIGS. 28A and 28B are a front view and a side view respectively showing a substrate assembly shown in FIG. 26B;

FIG. 28C is a view in cross section showing the substrate assembly along a line XXVIIIC—XXVIIIC in FIG. 28A;

FIGS. 29A and 29B are a front view and a rear view respectively showing a printed circuit assembly;

FIGS. 30A and 30B are a front view and a side view respectively showing an auxiliary substrate;

FIG. 30C is a view in cross section showing the auxiliary substrate along a line XXXC—XXXC in FIG. 30A;

FIG. 31 shows the positional relationships of the spherical lenses and the optical fibers with respect to the light emitting diode and photodiode;

FIG. 32 is a view in cross section showing another modification of the receptacle assembly;

FIGS. 33A, 33B, 33C and 33D are a front view, a right side view, a left side view, and a bottom view respectively showing a main receptacle body shown in FIG. 32;

FIG. 34 is a view in cross section showing the main receptacle body along a line XXXIV—XXXIV in FIG. 33B;

FIGS. 35A and 35B are a front view and a side view respectively showing an optical link assembly shown in FIG. 32;

FIG. 35C is a view in cross section showing the optical link assembly along a line XXXVC—XXXVC in FIG. 35A;

FIGS. 36A and 36B are a front view and a side view respectively showing a substrate assembly shown in FIG. 35A;

FIG. 36C is a view in cross section showing the substrate assembly along a line XXXVIC—XXXVIC in FIG. 36A; and FIG. 37 shows the positioning state of the optical link assembly shown in FIG. 35A.

DETAILED DESCRIPTION

Figure 15:
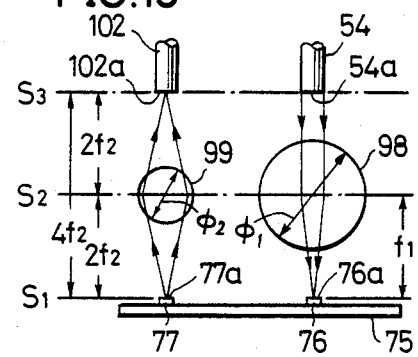
FIG. 15 shows an arrangement of a photodiode, a light emitting diode, spherical lenses, and optical fibers.

A conventional optical receiving module 10 has a construction shown in FIG. 1, for example. An optical plug 12 which is provided on an end of an optical cable 11 is detachably connected to a receptacle 13. The receptacle 13 is fixed to a vertical support plate 14. An optical link assembly 15 comprises an elongated plated printed circuit 16 having a light receiving element 17 and integrated circuit (IC) chips 18 and 19 mounted thereon, and a shield case 20 having the entire plated printed circuit 16 accommodated therein. The optical link assembly 15 thus as a rectangular parallelopiped shape. The optical link assembly 15 is arranged so that the longitudinal direction thereof coincides with an axial line 21 of the receptacle 13. For this reason, although a width W1 of the optical receiving module 10 is small, a length L1 of the optical receiving module 10 is considerably large and the overall size of the optical receiving module 10 is large. In addition, terminals 22 project from a rear surface of the optical link assembly 15 in the same direction as the axial line 21. As a result, when the length of the terminals 22 is also included in an overall length L2 of the optical receiving module 10, this overall length L2 becomes even greater than the length L1. Therefore, the conventional optical receiving module 10 has such a construction that it is difficult to downsize the optical receiving module 10.

The present invention has eliminated the problems described heretofore, and description will now be given with respect to an embodiment of the optical transmitting and/or receiving module according to the present invention.

First, description will be given with respect to a two-way transmission system 31 which is applied with the optical transmitting and/or receiving module according to the present invention by referring to FIG. 2. In FIG. 2, optical modems 32 and 33 each comprise a main modem body (not shown) and a receptacle assembly (not shown) which is connected to the main modem body, and is electrically connected to respective computers 34 and 35. An optical plug 37 which is provided on an end of an optical fiber cable 36 is connected to the receptacle assembly of the optical modem 32. An optical plug 38 which is provided on the other end of the optical fiber cable 36 is connected to the receptacle assembly of the optical modem 33. Information is optically transmitted between the optical modems 32 and 33, and the computers 34 and 35 become coupled with each other.

Next, description will be given with respect to an optical transmitting and receiving module 39 which comprises the optical plug 37 and the receptacle assembly 70.

FIGS. 3A through 3C show the optical plug 37, and FIGS. 4A through 4C show the receptacle assembly 70. FIG. 5 shows the internal construction of the optical transmitting and receiving module 39 in correspondence with the optical plug 37 and the receptacle assembly 70. FIG. 6 shows the optical transmitting and receiving module 39 in a state where the optical plug 37 is connected to the receptacle assembly 70. In FIG. 3A, the transmitting side is indicated by "T" and the receiving side is indicated by "R".

As best shown in FIGS. 3A through 3C and 5, the optical plug 37 comprises a housing 42 which is made up of an upper housing 40 and a lower housing 41. A pair of ferrule assemblies 43 and 44 are provided within the housing 42. Tip ends of ferrules 45 and 46 of the respective ferrule assemblies 43 and 44 project from the front face of the housing 42. Lock levers 47 and 48 are mounted on the respective sides of the housing 42, and a cable cover 49 is mounted on the rear of the housing 42.

The ferrule assemblies 43 and 44 will be described. As shown in FIG. 5, the ferrule assemblies 43 and 44 are provided on ends of respective cords 50 and 51 which constitutes the optical fiber cable 36. The ferrule assembly 43 comprises a pipe 52, a holder 53, the ferrule 45 and the like as shown in FIG. 7. The cord 50 comprises an optical fiber 54 in a central part thereof, a sheath 55 provided on an outermost periphery of the cord 50, and a protecting layer 56 and a reinforcing layer 57 provided around the optical fibers 54. The tip end of the cord 50 is treated so that the optical fiber 54 and the protecting layer 56 are exposed on the tip end of the cord 50. As shown in FIG. 8, the holder 53 comprises four arms 53a through 53d which are obtained by forming slits in the form of a cross on a cylindrical body which has a small hole in a bottom thereof. Fingers 53a-1 through 53d-1 are provided on the ends of the respective arms 53a through 53d. Threaded parts 53e are formed on the inner surfaces of the arms 53a through 53d, and threaded parts 53f are formed on the inner surfaces of the fingers 53a-1 through 53d-1.

The pipe 52 of the ferrule assembly 43 is inserted into the reinforcing layer 57 of the cord 50 which has the tip end thereof treated as described above, and fits over the protecting layer 56. The ferrule assembly 43 is assembled in a state where the tip end of the cord 50 is inserted into the holder 53 and the holder 53 is pushed into the ferrule 45. The arms 53a through 53d are deformed so as to close upon each other when the holder 53 is pushed into the ferrule 45, and the sheath 55 is effectively bound by the arms 53a through 53d in a state where the threaded parts 53e intrude the sheath 55. Similarly, the protecting layer 56 is effectively bound by the fingers 53a-1 through 53d-1 in a state where the threaded parts 53f intrude the protecting layer 56. The pipe is inserted on the inside of the reinforcing layer 57 which is easily contractible so that the displacement of the sheath 55 toward the center of the cord 50 is prevented and the threaded parts 53e effectively intrude the sheath 55. As a result, the sheath 55 and the protecting layer 56 are independently prevented from slipping off, and the cord 50 and the ferrule assembly 43 are strongly unified. The optical fiber 54 projects from the holder 53 and enters within a columnar projection 45a of the ferrule 45. The periphery of the optical fiber 54 is fixed within the columnar projection 45a by epoxy system adhesive 58, and the tip end of the optical fiber 54 is exposed at the tip end surface of the columnar projection 45a.

A washer 59 and a helical compression spring 60 are fitted over the outer periphery of the holder 53. The washer 59 makes contact with a flange 53g of the holder 53. The spring 60 is provided between the washer 59 and a rear flange 45b of the ferrule 45 in a state where one end of the spring 60 is stopped by the washer 59 and the other end of the spring 60 is stopped by the rear flange 45b. The washer 59 and the spring 60 are fitted over the periphery of the holder 53 in an assembling stage before the holder 53 is pushed into the ferrule 45, and are mounted with ease to predetermined positions by pushing the holder 53 into the ferrule 45.

A flange 53h is formed on the rear end of the holder 53.

The other ferrule assembly 44 has the same construction as the ferrule assembly 43 described above. Excluding the ferrule 46, those parts of the ferrule assembly 44 which are the same as those corresponding parts of the ferrule assembly 43 will be designated by the same reference numerals with an affix "A" and description thereof will be omitted.

Next, description will be given with respect to the mounting of the ferrule assembly 43 in the housing 42.

First, description will be given with respect to the assembling related to the lower housing 41. As shown in FIGS. 9A through 9C, semi-cylindrical grooves 61 and 61A for accomodating the ferrule assemblies 43 and 44 are formed on the lower housing 41. The groove 61 comprises a groove portion 61a for receiving the ferrule 45, groove portions 61b and 61c for receiving the respective flanges 53g and 53h of the holder 53, and a groove portion 61d for receiving the spring 60, the flange 45b, and the washer 59. The depth of the groove portion 61d is greater than those of the groove portions 61a and 61c. Tapered surfaces 61d-1a and 61d-2a are formed on upper ends of respective end surfaces 61d-1 and 61d-2 of the groove portion 61d. The other groove 61A has the same construction as the groove 61 and description thereof will be omitted. A projection 62 for guiding the cords 50 and 51 is formed between the rear ends of the grooves 61 and 61A. Further, a narrow groove 63 for receiving a flange of the cable cover 49 is formed on the rear end of the lower housing 41.

As shown in FIGS. 5 and 10, the ferrule assembly 43 is mounted on the lower housing 41 in a state where a cylindrical portion 45c of the ferrule 45 fits into the groove portion 61a, the flanges 53g and 53h of the holder 53 fit into the respective groove portions 61b and 61c, and the washer 59, the flange 45b, and the spring 60 fit into the groove portion 61d. The washer 59 makes contact with the end surface 61d-2, the flange 45b makes contact with the end surface 61d-1, and the spring 60 is in a compressed state. The flange 45b and the washer 59 fit into the groove portion 61d with ease under the guidance of the tapered surfaces 61d-1a and 61d-2a. The other ferrule 44 fits into the groove 61A in a similar manner. Further, the upper housing 40 is placed on top of the lower housing 41 and are fixed together by a screw, and the ferrule assemblies 43 and 44 are accommodated within the housing 42.

Accordingly, the ferrule assemblies 43 and 44 are urged in a direction A by the actions of the springs 60 and 60A. In addition, the ferrule assemblies 43 and 44 each project from the front face of the housing 42 by a distance M for the reasons which will be described later in conjunction with an optical link assembly 72.

Since the ferrule assemblies 43 and 44 project from the front face of the housing 42 by the same distance M, it is possible to use the same parts to make the ferrule assemblies 43 and 44. Moreover, because the grooves 61 and 61A each are symmetrical with respect to the right and left sides, the process of making dies is simplified and the manufacturing cost of the ferrule assemblies 43 and 44 can be kept down to a minimum.

As shown in FIG. 5, the cords 50 and 51 are guided and forcibly spread along respective paths by the projection 62 at the entrance part of the housing 42. Forces which act on the cords 50 and 51 to close upon each other due to the resiliency of the cords themselves, are stopped by the projection 63 and do not affect the ferrule assemblies 43 and 44. Hence, the ferrule assemblies 43 and 44 are provided within the housing 42 in a state where the axes of the ferrule assemblies 43 and 44 are accurately parallel to each other.

Next, description will be given with respect to a receptacle assembly 70 by referring to FIGS. 4A through 4C, 5, and 12A through 12C.

As shown in FIG. 5, the receptacle assembly 70 generally comprises a main receptacle body 71 and the optical link assembly 72, and is mounted on the optical modem 32 shown in FIG. 2.

The main receptacle body 71 comprises a receiving part 71a for receiving a projecting part 42a of the housing 42 of the optical plug 37, cylindrical ferrule securing parts 71b and 71c provided at the inner part of the receiving part 71a, and locking parts 71e and 71d respectively provided on the right and left sides of the main receptacle body 71. The securing parts 71b and 71c are provided on a plate part 71g, and a positioning pole 71f is provided on the plate part 71g at an intermediate position between the securing parts 71b and 71c.

As shown in FIGS. 12A through 12C, the optical link assembly 72 comprises a substrate assembly 73 shown in FIG. 13 with a cap 74 which covers the substrate assembly 73.

The substrate assembly 73 comprises a flat ceramic substrate 75 having an elongated rectangular shape as shown in FIG. 13. A photodiode 76, a light emitting diode (LED) 77, and transistor-transistor logic integrated circuit (TTLIC) chips 78 and 79 are provided on the substrate 75 by wire bonding. Each circuit element provided on the substrate 75 is positioned with reference to a hole 75a which will be described later. The photodiode 76 and the LED 77 are arranged symmetrically with reference to the hole 75a. As shown in FIG. 14, an LED mounting part 81, a chip mounting part 82, and wire bonding parts 83, 84, and 85 are provided on the substrate 75 on the right with reference to the hole 75a along the longitudinal direction of the substrate 75. On the other hand, a photodiode mounting part 86, a chip mounting part 87, and wire bonding parts 88 through 94 are provided on the substrate 75 on the left with reference to the hole 75a along the longitudinal direction of the substrate 75. All of the above mounting parts and wire bonding parts have a laminated construction wherein a layer of nickel (Ni) and a layer of gold (Au) are formed on a layer of tungsten (W). A tungsten layer 95 for shielding is formed in a generally U-shape so as to surround the LED 77. Soldering parts 96b and 96a are provided on the upper right and left corners of the substrate 75. Positioning cutouts 75c and 75b are formed on the right and left sides of the substrate 75, and cutouts 75d and 75e which function as through holes are formed in the soldering parts 96a and 96b. The chips 78 and 79 are arranged on the outer side of the photodiode 76 and the LED 77, and the photodiode 76 and the LED 77 are arranged closer to the hole 75a. Hence, the ferrules 43 and 44 which respectively oppose the photodiode 76 and the LED 77 can be arranged close together and it is possible to effectively downsize the optical plug 37. Further, since the substrate 75 is flat, the construction of the substrate assembly 73 is simple compared to the case where the substrate has a depression.

As shown in FIG. 13, an output terminal 97a of the chip 78, a ground terminal 97b of the chip 78, a power source terminal 97c of the chip 78, a ground terminal 97d of the cap 74, a ground terminal 97e of the chip 79, an anode terminal of the LED 77, a power source terminal of the chip 79, and an input terminal of the chip 79 extend downwardly from the substrate 75 and are arranged from the right to left. The chips 78 and 79 are grounded independently from the cap 74. Because the output terminal 97a of the chip 78 and the input terminal 97h of the chip 79 are arranged on the outer side as shown, the interference of signals is effectively prevented and the reliability of the circuit is improved. In addition, the terminals 97a through 97h can be mounted on the substrate 75 with ease since the terminals 97a through 97h are mounted in a state parallel to the surface of the substrate 75.

The cap 74 is made of brass, and comprises first and second cap portions 74a and 74b which have a bowl shape and are arranged side by side. A spherical lens 98 having a diameter $\phi_1$ is fixed on the first cap portion 74a, and spherical lens 99 having a diameter $\phi_2 (=\phi_1/2)$ is fixed on the second cap portion 74b. The cap 74 is fixed on the substrate 75. The first cap portion 74a covers and seals the photodiode 76 and the chip 78, and the second cap portion 74b covers and seals the LED 77 and the chip 79. The spherical lenses 98 and 99 are arranged directly above the photodiode 76 and the LED 77, respectively. The cap 74 is soldered onto the substrate 75 at the soldering parts 96a and 96b and the necessary grounding can be obtained. In addition, parts of the cap 74 making contact with the substrate 75 are applied with an adhesive so as to positively fix the cap 74 on the substrate 75. The cap 74 comprises a center hole 74c and cutouts 74e and 74d formed on the right and left sides thereof. The first and second cap portions 74a and 74b have a shielding function, and the leakage of light and electrical signals is prevented. Since the first and second cap portions 74a and 74b are unified, the number of assembling processes and the number of parts are reduced compared to the case where the first and second cap portions are independent parts.

The optical link assembly 72 is made in the following manner. First, the photodiode 76, the LED 77, and the chips 78 and 79 are fixed on the substrate 75 by wire bonding. The spherical lenses 98 and 99 are mounted on the cap 74, and the cap 74 is fixed on the substrate 75 by use of the adhesive. The lead terminals and the cap 74 are soldered.

The optical link assembly 72 is centered with respect to the main receptacle body 71 by the positioning pole 71f which fits into the holes 74c and 75a at the rear of the ferrule securing parts 71b and 71c as shown in FIG. 5. The cutouts 74d and 75c fit over a projection 71h and the cutouts 74e and 75b fit into a projection 71i as shown in FIG. 12A so as to position the optical link assembly 72 with respect to the right and left sides of the main receptacle body 71. The spherical lenses 98 and 99 are accurately positioned along respective center axes of the ferrule securing parts 71b and 71c. Since the optical link assembly 72 is attached to the main receptacle body 71 in the state where the positioning pole is inserted through the holes 74c and 75a, the positioning of the optical link assembly 72 with respect to the main receptacle body 71 is accurate compared to the case where the positioning is achieved by use of the external edge of the optical link assembly 72, and the positioning is unaffected by an error in the external size of the optical link assembly 72.

The optical link assembly 72 is inserted and fit into the rear part of the main receptacle body 71, and the rear of the optical link assembly 72 makes contact with a rubber plate 101 which is pushed in a direction B by a cover 100. Due to the provision of the rubber plate 101, the optical link assembly 72 has a satisfactory shock resistance characteristic. The cover 100 is fixed to the main receptacle body 71 in a state where projections 100a and 100b of the cover 100 fit into respective slits 71j and 71k. The cover 100 covers the rear of the main receptacle body 71 and also secures the tip end of the positioning pole 71f. Accordingly, the rear of the optical link assembly 72 is completely protected, and the positioning of the optical link assembly 72 with respect to the main receptacle body 71 is firm because the tip end of the positioning pole 71f is fixed by the cover 100. The photodiode 76 and the LED 77 can be positioned with ease since the distance between centers of the photodiode 76 and the positioning pole 71f is the same as the distance between centers of the LED 77 and the positioning pole 71f.

The optical link assembly 72 is inserted into the main receptacle body 71 in such a direction that the surface of the substrate 75 is perpendicular to an axis 1 of the main receptacle body 71. For this reason, a length L3 of the receptacle assembly 70 is kept to a minimum and a width W2 of the receptacle assembly 70 is reasonable value. Thus, the size of the receptacle assembly 70 is considerably small compared to that of the conventional receptacle assembly. Therefore, it is possible to reduce the overall size of the optical modem 32 shown in FIG. 2 which comprises the main modem body (not shown) and the receptacle assembly 70 which is connected to the main modem body. The axis 1 described above is a line parallel to center lines of the ferrule securing parts 71b and 71c, that is, a line parallel to optical axes of the optical fibers 52 and 102 within the optical plug 37 which is connected to the receptacle assembly 70.

As shown in FIGS. 4B and 4C, the terminals 97a through 97h extend downwardly from the main receptacle body 71. Hence, it is easy to connect the terminals 97a through 97h to a plated printed circuit (not shown) in the main modem body of the optical modem 32 when connecting the receptacle assembly 70 to the main modem body.

Since the external size of the receptacle assembly 70 is small, a length L4 and the width W2 of the optical transmitting and receiving module 39 which comprises the optical plug 37 connected to the receptacle assembly 70 as shown in FIG. 6, are small. As a result, the overall size of the optical transmitting and receiving module 39 is small compared to that of the conventional module.

Next, description will be given with respect to the state where the optical plug 37 is connected to the receptacle assembly 70 by referring particularly to FIGS. 6 and 11.

The optical plug 37 is fit into the receiving part 71a in a state where planed-down portions 42a-1 and 42a-2 of the projecting part 42a shown in FIG. 3C correspond to respective planed-down portions 71a-1 and 71a-2 of the receiving part 71a shown in FIG. 4C and ribs 42a-3 and 42a-4 of the projecting part 42a are guided by respective grooves 71a-3 and 71a-4 of the receiving part 71a. The locking parts 71d and 71e engage with respective holes 47a and 48a in the lock levers 47 and 48 so as to positively connect the optical plug 37 and the receptacle assembly 70.

Tip end stepped portions 45c-1 and 46c-1 on the respective cylindrical portions 45a and 46c of the ferrules 45 and 46 make contact with corresponding tip end surfaces 71b-1 and 71c-1 of the ferrule securing parts 71b and 71c. The columnar projections 45a and 46a are fit into the respective ferrule securing parts 71b and 71c. The ferrule assemblies 43 and 44 are pushed in the direction B by a quantity ΔM, and the springs 60 and 60A become further compressed. Hence, the ferrule assemblies 43 and 44 are accurately and stably maintained in a state where the stepped portions 45c-1 and 46c-1 are in positive contact with the tip end surfaces 71b-1 and 71c-1 which are taken as reference surfaces.

Accordingly, as shown in FIG. 12C, the light which is emitted from the end surface of the optical fiber 54 within the cord 50 (ferrule 45) and is converged on the photodiode 76 by use of the spherical lens 78 undergoes a photoelectric conversion. The light emitted from the LED 77 is converged by the spherical lens 99 and enters the optical fiber 102 within the cord 51 (ferrule 46) from the end surface of the optical fiber 102.

Normal convex lenses may be used instead of the spherical lenses 98 and 99.

Next, description will be given with respect to the arrangement and the focal length of the spherical lenses 98 and 99, and the arrangement of the optical fibers 54 and 102 which is determined thereby.

FIG. 15 shows the arrangement of the light emitting diode, the photodiode, the spherical lenses, and the optical fibers. The photodiode 76 and the LED 77 are fixed on the flat substrate 75, and a light receiving surface 76a and a light emitting surface 77a are arranged in a first plane S1. The centers of the spherical lenses 98 and 99 are arranged on a second plane S2 which is parallel to the first plane S1. The end surfaces of the optical fibers 102 and 54 are arranged on a third plane S3 which is parallel to the first plane S1. As will be described later, the position of the plane S3 is determined by a focal distance $f_2$ of the spherical lens 99. The second plane S2 is positioned at the center between the first and third planes S1 and S3.

The spherical lens 99 converges the diffused light emitted from the LED 77 on an end surface 102a of the optical fiber 102. As will be described later, when the spherical lens 99 deviates from the second plane S2 toward the LED 77, the quantity of light reaching the end surface 102a of the optical fiber 102 decreases. Further, the deviation of the spherical lens in a direction perpendicular to the optical axis is enlarged and appears as a deviation in the image on the end surface 102a. On the other hand, when the spherical lens 99 deviates from the second plane S2 toward the optical fiber 102, the transmittance of the diffused light from the LED 77 with respect to the spherical lens 99 decreases, and the quantity of light reaching the end surface 102a decreases. Hence, the spherical lens 99 must be positioned with a high accuracy. Accordingly, the spherical lens 99 is arranged on the second plane S2, and the distance between the first and second planes S1 and S2 and the distance between the second and third planes S2 and S3 are set to two times the focal length $f_2$ of the spherical lens 99, that is, set to $2f_2$. The diameter $100_2$ of the spherical lens 99 is set to 1 mm so that the focal length $f_2$ becomes equal to 0.73 mm.

On the other hand, the spherical lens 98 converges the parallel light emitted from an end surface 54a of the optical fiber 54 on the light receiving surface 76a. Since the spherical lens 98 is arranged on the second plane S2, the diameter $\phi_1$ of the spherical lens 98 is set to such a value that a focal length $f_1$ thereof becomes equal to $2f_2$.

Next, description will be given with respect to the allowable range of the positional deviation of the spherical lens 99 from the second plane S2 toward the LED 77 or the optical fiber 102.

It will be assumed that the optical modem 33 on the receiving side of the optical fiber cable 36 operates normally until the quantity of light reaching the optical fiber 102 decreases to ½ the regular quantity of light which reaches the optical fiber 102 when the spherical lens 99 is arranged on the second plane S2. It will be described that the allowable limit in which the spherical lens 99 can positionally deviate is exceeded when the quantity of light reaching the optical fiber 102 becomes smaller than ½ the above regular quantity.

Figure 16:
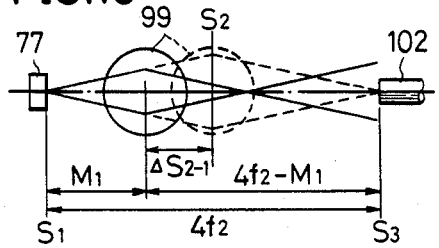
FIGS. 16 and 17 respectively are diagrams for explaining an allowable range of the positional deviation of the spherical lens when the spherical lens is deviated toward the light emitting diode and the optical fiber.

As shown in FIG. 16, when the spherical lens 99 deviates from the second plane S2 toward the LED 77, the traveling path of the light emitted from the LED 77 changes from a path indicated by a phantom line to a path indicated by a solid line. Hence, the quantity of light reaching the optical fiber 102 decreases. In the case where the quantity of light reaching the optical fiber 102 becomes ½ the regular quantity, that is, in the case where the lateral magnification becomes equal to $\sqrt{2}$, the position of the spherical lens 99 can be described by the following equation (1), where $M_1$ represents the distance between the light emitting surface 77a of the LED 77 and the center of the spherical lens 99 which is positionally deviated to the limit toward the LED 77.

$$(4f_2 - M_1)/M_1 = \sqrt{2} \tag{1}$$

The following equation (2) can be obtained by rewriting the equation (1) in terms of $M_1$.

$$(\sqrt{2}+1)M_1 = 4f_2 \quad (2)$$

When $f_2 = 0.73$ mm is substituted in the equation (2), $M_1$ becomes approximately equal to 1.21 mm. Accordingly, an allowable range $\Delta S_{2-1}$ in which the spherical lens 99 can positionally deviate toward the LED 77 is equal to 0.25 mm. This allowable range $S_{2-1}$ corresponds to approximately 17% of the distance $2f_2$ (=1.46 mm) between the first and second planes S1 and S2.

Figure 17:
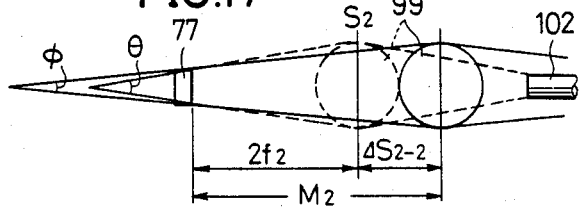

On the other hand, when the spherical lens 99 positionally deviates toward the optical fiber 102, the divergence angle of the light emitted from the LED 77 and reaching the spherical lens 99 decreases from $\theta$ to $\phi$ as shown in FIG. 17. The width of the LED 77 is equal to 0.37 mm and the diameter of the spherical lens 99 is equal to 1 mm. The angles $\theta$ and $\phi$ can be described by the following equations (3) and (4), where $M_2$ represents the distance between the light emitting surface 77a of the LED 77 and the center of the spherical lens 99 which is positionally deviated to the limit toward the optical fiber 102.

$$\theta/2 = \tan^{-1}[(0.5-0.185)/2f_2] \quad (3)$$

$$\phi/2 = \tan^{-1}[(0.5-0.185)/M_2] \quad (4)$$

When $f_2 = 0.73$ mm is substituted into the equation (3), the angle $\theta$ becomes equal to 12.175°.

The value of $M_2$ when the angle $\phi$ becomes equal to $\theta/\sqrt{2}$ (=8.61°) can be obtained from $\tan^{-1}(0.315/M_2) = 8.61°$, and in this case, $M_2 = 2.08$ mm. Accordingly, an allowable range $S_{2-2}$ in which the spherical lens 99 can positionally deviate toward the optical fiber 102 is equal to 0.67 mm. This means that the quantity of light reaching the spherical lens 99 decreases to ½ the regular quantity when the spherical lens 99 positionally deviates from the regular position toward the optical fiber 102 by a distance of 0.67 mm. The allowable range $S_{2-1}$ corresponds to approximately 42% of the distance $2f_2$ (=1.46 mm) between the second and third planes S2 and S3.

Hence, it is found that the spherical lens 99 may not be exactly in the first plane S1, and the position of the spherical lens 99 may be deviated toward the LED 77 within the allowable range of 0.25 mm and may be deviated toward the optical fiber 102 within the allowable range of 0.67 mm.

Next, description will be given with respect to the tolerance to the diameter $\phi_2$ of the spherical lens 99.

Figure 18:
FIGS. 18 and 19 respectively are diagrams for explaining a tolerance of the diameter of the spherical lens which is arranged opposite to the light emitting diode.

FIG. 18 shows a case where the diameter $\phi_2$ of the spherical lens 99 is smaller than a most suitable value. When the diameter $\phi_2$ of the spherical lens 99 is small, the divergence angle of the light emitted from the LED 77 and reaching the spherical lens 99 decreases as in the case shown in FIG. 17. A diameter $\phi_{2a}$ of the spherical lens 99 when the divergence angle becomes equal to $1/\sqrt{2}$ the regular angle $\theta$, can be obtained similarly as in the case shown in FIG. 17, and $\phi_{2a} = 0.81$ mm.

Figure 19:
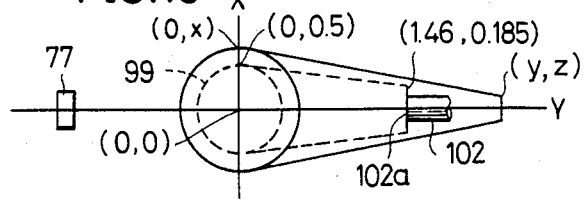
Figure 21B:
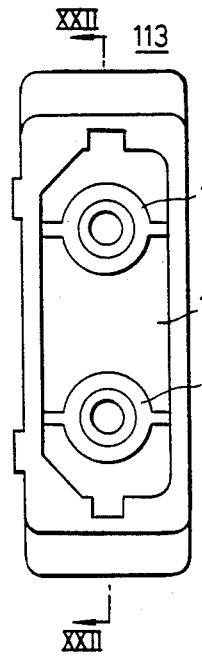
FIGS. 21A, 21B, 21C and 21D are a front view, a left side view, a right side view, and a bottom view respectively showing a main receptacle body shown in FIG. 20.
Figure 21A:
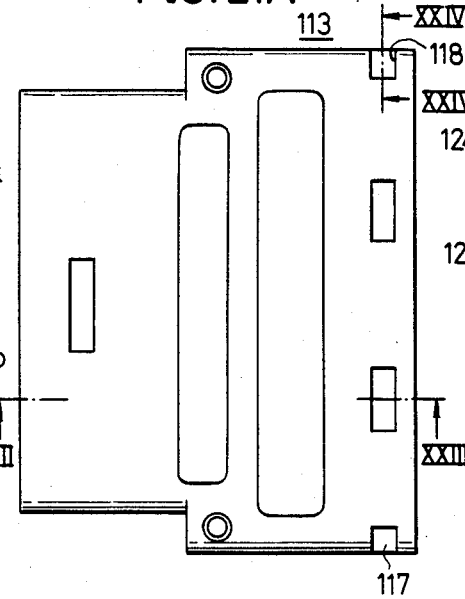
Figure 21C:
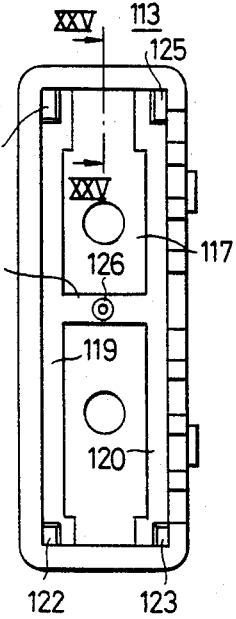
Figure 21D:
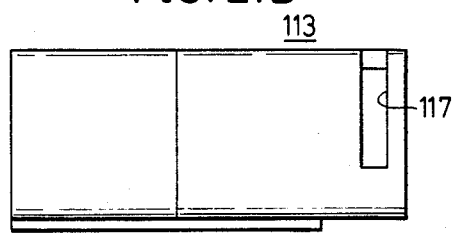
Figure 24:
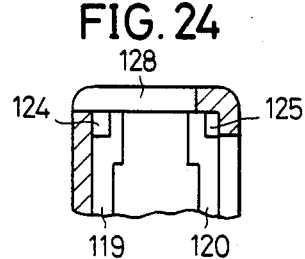
Figure 25:
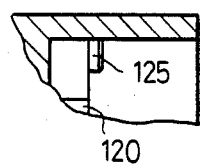
FIG. 25 is a view in cross section showing the main receptacle body along a line XXV—XXV in FIG. 21C.

FIG. 19 shows a case where the diameter $\phi_2$ of the spherical lens 99 is larger than the most suitable value. When the diameter $\phi_2$ of the spherical lens 99 is large, the focal length of the spherical lens 99 also becomes large. A position (y, z) of the image formation can be obtained from the following for the case where the diameter $\phi_2$ is equal to 2x, by the X-Y coordinate system shown in FIG. 19 having the center of the spherical lens 99 as the origin (0, 0).

$$(1/1.46) + (1/y) = 1/[(x/0.5) \cdot 0.73]$$

Hence, $$x = y/(1.46 + y) \quad (5)$$

From the lateral magnification, $y/1.46 = z/0.185$, and thus, $$z = 0.127y \quad (6)$$

Assuming a case where the cross section of the diverged light on the end surface 102a of the optical fiber 102 becomes two times that of the case where the diameter $\phi_2$ of the spherical lens 99 is equal to 1 mm, this case can be described by the following.

$$[(x-y)/y](y-1.46) + z = 0.185 \cdot \sqrt{2} \quad (7)$$

When the equations (5) and (6) are substituted into the equation (7), the following result is obtained.

$$x \approx 0.54$$

$$y \approx 1.704$$

$$z \approx 0.216$$

Accordingly, the maximum diameter of the spherical lens 99 is equal to 1.08 mm. Therefore, the diameter of the spherical lens 99 should be within a range of 0.81 mm to 1.08 mm.

Next, description will be given with respect to a modification of the receptacle assembly which constitutes the optical transmitting and/or receiving module according to the present invention.

FIG. 20 shows a receptacle assembly 111 which connects to the optical plug 37 indicated by a phantom line. The receptacle assembly 111 generally comprises a main receptacle body 113 and an optical link assembly 114.

As shown in FIGS. 21A through 21D and FIGS. 22 through 25, the main receptacle body 113 comprises a receiving part 115 for receiving the optical plug 37, cylindrical ferrule securing parts 116a and 116b provided at the inner part of the receiving part 115, and an optical link assembly accommodating part 117 on the rear of the ferrule securing parts 116a and 116b. The receiving part 115 and the accommodating part 117 are partitioned by a wall 118 on which the ferrule securing parts 116a and 116b are provided. The accommodating part 117 comprises stepped portions 119 and 120 respectively extending horizontally along the top and bottom thereof, a stepped portion 121 which extends between the stepped portions 119 and 120, and positioning projections 122 through 125. The projections 122 through 125 each have a rectangular shape when viewed from the opening of the accommodating part 117. The projections 122 through 125 are provided at respective four corners of the accommodating part 117 and project from the stepped portions 119 and 120.

The optical link assembly 114 comprises an elongated rectangular shaped substrate assembly 130 and caps 131 and 132 covering the substrate assembly 130, as shown in FIGS. 26A through 26C and 27.

As shown in FIGS. 28A through 28C, the substrate assembly 130 comprises a plated printed circuit assembly 133 shown in FIGS. 29A and 28B and an auxiliary substrate 134 shown in FIGS. 30A through 30C. The auxiliary substrate 134 is adhered on the plated printed circuit assembly 133.

As shown in FIGS. 29A and 29B, the plated printed circuit assembly 133 comprises a ceramic substrate 135 having mounting parts 136 through 139. A photodiode 140, an IC chip 141, an LED 142, and an IC chip 143 are mounted on the respective mounting parts 136 through 139 of the plated printed circuit assembly 133. A circuit part of the receiving side comprising the photodiode 140 and the chip 141 easily generate an oscillation, however, the oscillation is positively prevented in the present embodiment by taking the following measures. That is, firstly, a ground terminal of the chip 143 is connected to grounding patterns 144a and 144b by wire bonding, so that a grounding current does not flow through the printed pattern on the mounting part 137. Secondly, the caps 131 and 132 respectively covering the receiving and transmitting parts, are independent bodies. The grounding patterns 144a and 144b are connected to a grounding pattern formed on the back side of the substrate 135 by way of a through hole. In addition, the grounding patterns 145 and 146 are formed to respectively surround the receiving and transmitting parts. A terminal pattern 147 is formed on the back side of the substrate 135, and terminals 148 are soldered on the terminal pattern 147 so as to extend in a direction similar to that of the terminals 97a through 97h described before, as shown in FIGS. 26A through 26C. The substrate 135 has no cutouts formed on the periphery thereof, and the substrate 135 can be mass produced with ease.

The auxiliary substrate 134 has the same size as the plated printed circuit assembly 133. As shown in FIGS. 30A through 30C, the auxiliary substrate 134 comprises cutouts 134a through 134d formed on the respective corners thereof, and approximately U-shaped cutouts 134e and 134f formed on the right and left thereof. The auxiliary substrate 134 further comprises rectangular openings 134g and 134h, and three penetrating holes 134i, 134j, and 134k. The auxiliary substrate 134 is adhered on the plated printed circuit assembly 133 in a state where the penetrating hole 134i coincides with a penetrating hole 135a of the substrate 135.

As shown in FIGS. 28A through 28C, the substrate assembly 130 comprises a penetrating hole 150 which is provide at a position slightly deviated from the center toward the left, concave parts 151 and 152 which are respectively formed by the penetrating holes 134j and 134k at positions above right and above left of the penetrating hole 150, an electronic part accommodating part 155 which encloses the receiving part formed on the right in the opening 134g and accommodates the photodiode 140 and the chip 141, an electronic accommodating part 156 which encloses the transmitting part formed on the left in the opening 134h and accommodates the LED 142 and the chip 143, cutout concave parts 157 through 160 formed at the four corners by the cutouts 134a through 134d, and cutout concave parts 161 and 162 formed on the right and left by the cutouts 134e and 134f.

As shown in FIGS. 26A through 26C and 27, the caps 131 and 132 are both made of pressed brass. The cap 131 comprises a bowl shaped cap portion 131a and a frame portion 131b which surrounds the cap portion 131a, and the cap 132 comprises a bowl shaped cap portion 132a and a frame portion 132b which surrounds the cap portion 132a. Spherical lenses 163 and 164 are fixed to the respective cap portions 131a and 132a. A projecting portion 131b-1 which fits into the concave part 151 and a projecting piece 131b-2 which fits into the concave part 161 are formed on the frame portion 131b. Similarly, a projecting portion 132b-1 which fits into the concave part 152 and a projecting piece 132b-2 which fits into the concave part 162 are formed on the frame portion 131b. The dimensions of these parts are selected so that the projecting portions 131b-1 and 132b-1 fit into the respective concave parts 151 and 152 without play and the projecting pieces 131b-2 and 132b-2 fit into the respective concave parts 161 and 162 without play.

The projecting portion 131b-1 of the cap 131 fits into the concave part 151 and is positioned in the radial direction about the center of the concave part 151. Further, the projecting piece 131b-2 fits into the concave part 161 and is positioned with respect to the rotary direction. The cap 131 is mounted on the substrate assembly 130 in this state, and thus, the spherical lens 163 accurately opposes the photodiode 140. The projecting portion 132b-1 of the other cap 132 fits into the concave part 152 and is positioned in the radial direction about the center of the concave part 152. Further, the projecting piece 132b-2 fits into the concave part 162 and is positioned with respect to the rotary direction. The cap 132 is mounted on the substrate assembly 130 in this state, and thus, the spherical lens 164 accurately opposes the LED 142. Accordingly, the caps 131 and 132 themselves have positioning means, and it is unnecessary to use positioning tools when mounting the caps 131 and 132 on the substrate assembly 130. In other words, the caps 131 and 132 are easily positioned with a satisfactory accuracy by simply placing the caps 131 and 132 on top of the substrate assembly 130 at respective planned positions.

Cutouts 131b-3 and 131b-4 corresponding with the concave parts 157 and 158 are formed on the frame portion 131b of the cap 131. Similarly, cutouts 132b-3 and 132b-4 corresponding with the concave parts 159 and 160 are formed on the frame portion 132b of the cap 132. Hence, the caps 131 and 132 are mounted substrate assembly 130 without projecting from the substrate assembly 130. In addition, the caps 131 and 132 are shaped so as to avoid the penetrating hole 150. The sizes of the caps 131 and 132 are selected so that the outer peripheral edges of the caps 131 and 132 fall short of the outer peripheral edge of the plated printed circuit assembly 133 by a gap g when the caps 131 and 132 are mounted. When mass producing the optical link assembly 114, a plurality of plated printed circuit assemblies existing on a single large substrate are cut into individual plated printed circuit assemblies. Hence, even in the case where the size of the plated printed circuit assemblies on the substrate is slightly smaller than a designed value due to error, the outer peripheral edges of the caps 131 and 132 will not project from the outer peripheral edge of the plated printed circuit assemblies due to the provision of the above gap g.

The optical link assembly 114 is mass produced in the following sequence. A plurality of the auxiliary substrates 134 are adhered on a plurality of plated printed circuit assemblies 133 which exist on the single large substrate which is not yet cut into the individual plated printed circuit assemblies 133. The photodiode 140, the LED 142, and the chips 141 and 143 are mounted on each of the plated printed circuit assemblies 133. The mounted circuit elements are fixed to the plated printed circuit assemblies 133 by wire bonding. The caps 131 and 132 are mounted on each of the plated printed circuit assemblies 133, and the spherical lenses 163 and 164 are fixed to the respective caps 131 and 132. The plated printed circuit assemblies 133 existing on the single substrate are cut into individual plated printed circuit assemblies 133. The terminals 148 are mounted on each of the individual plated printed circuit assemblies 133, and capacitors are mounted on the back of the individual plated printed circuit assemblies 133. The caps 131 and 132 are then soldered on the respective individual plated printed circuit assemblies 133. The soldering of the caps 131 and 132 is performed between the projecting pieces 131b-2 and 132b-2 and the grounding patterns on the substrates. Hence, the caps 131 and 132 are positively grounded.

The optical link assembly 114 is fit into the accommodating part 117 of the main receptacle body 113 in a state where the surface of the substrate assembly 130 is perpendicular to an axis $l_1$ of the main receptacle body 113 as shown in FIG. 20. In other words, with respect to the direction of a plane perpendicular to a direction C, the penetrating hole 150 fits over a positioning pin 126 projecting from the stepped portion 121 and the optical link assembly 114 is restricted in the radial direction about the pin 126, and the concave parts 157 through 160 engage with the respective positioning projections 122 through 125 as shown in FIG. 26A and the optical link assembly 114 is restricted in the rotating direction. With respect to the direction C, the optical link assembly 114 is supported by a rubber plate 166 which has the rear thereof pushed by a cover 165, and the front of the optical link assembly 114 makes contact with the stepped portions 119, 120, and 121 so as to restrict the position of the optical link assembly 114. FIGS. 165a and 165b on both sides of the cover 165 engage with respective slits 127 and 128 of the main receptacle body 113.

The positional restriction of the optical link assembly 114 in the rotating direction is carried out by use of the concave parts 157 through 160. Hence, the optical link assembly 114 is positioned with a satisfactory accuracy without being affected by flash even when flash exists on the outer peripheral edge of the substrate assembly 130. In other words, in the conventional case, the positional restriction is carried out by use of the outer peripheral edge of the substrate assembly, and for this reason, the external size of the substrate assembly must be accurate and there must be no flash on the outer peripheral edge of the substrate assembly in order to obtain a satisfactory positional restriction. However, according to the present embodiment, the outer peripheral edge of the substrate assembly 130 is not used for the positional restriction, and thus, the accuracy with which the substrate assembly 130 must be made does not need to be as accurate as in the conventional case, and the substrate assembly 130 is suited for mass production.

Since the optical link assembly 114 is positionally restricted and amounted as described heretofore, the spherical lenses 163 and 164 are positioned to accurately oppose the respective ferrule securing parts 116a and 116b.

When the receptacle assembly 111 and the optical plug 37 are connected as shown in FIG. 20, the axes of the optical fibers 54 and 102 within the respective ferrules 45 and 46 which are secured to the ferrule securing parts 116a and 116b coincide with the optical axes of the corresponding spherical lenses 163 and 164.

As shown in FIG. 31, the spherical lenses 163 and 164 are the same and have a focal length $f_3$ of 0.73 mm. The spherical lens 163 on the transmitting side is arranged at a position which is separated by $2f_3$ from the LED 142, and the end surface of the optical fiber 102 is arranged at a position which is separated from the surface of the LED 142 by $4f_3-x_1$, where $x_1$ is equal to 0.31 mm in this case. The optical fiber 102 is normally positioned so that the end surface of the optical fiber 102 is a distance $4f_3$ from the surface of the LED 142. However, as a result of performing experiments wherein the light emitted from one end of the optical fiber 102 having a predetermined length is subjected to photoelectric conversion on the other end so as to obtain the energy of the light as electrical power, it was found that the output from $-22$ dBm to a value in a range of $-20$ dBm to $-21$ dBm when the optical fiber 102 is positionally deviated from the regular position toward the LED 142 by the distance $x_1$. Hence, in the present embodiment, the optical fiber 102 is positioned so that the end surface thereof is separated by $4f_3-x_1$ from the surface of the LED 142, and the information is effectively transmitted from the receptacle assembly 111 to the optical plug 37. On the other hand, the spherical lens 163 is arranged at a position which is separated by $3f_3-x_1$ from the surface of the photodiode 140, that is, at a position which is separated by $f_3$ from the end surface of the optical fiber 54.

Next, description will be given with respect to another modification wherein the optical transmitting and/or receiving module according to the present invention is applied to a one-way transmission system.

A receptacle assembly 170 shown in FIG. 30 is applied to the one-way transmission system. The receptacle assembly 170 generally comprises a main receptacle body 171 and an optical link assembly 172.

The main receptacle body 171 comprises an optical plug receiving part 173, a ferrule securing part 174, and an optical link assembly accommodating part 175 as shown in FIGS. 33A through 33D. An optical plug 200 is fit into the receiving part 173 as indicated by a two-dot chain line in FIG. 32, and a ferrule 201 is inserted into the securing part 174. Engaging pins (not shown) of the optical plug 200 engage locking grooves 176a and 176b, and the optical plug 200 is positively connected to the receptacle assembly 170.

The accommodating part 175 comprises elongated stepped portions 177 and 178 which respectively extend horizontally along the top and bottom of the accommodating part 175, and positioning projections 179 through 182. The positioning projections 179 through 182 have a rectangular shape when viewed from the rear opening of the accommodating part 175. The positioning projections 179 through 182 are formed on the four corners of the accommodating part 175 and project from the stepped portions 177 and 178.

As shown in FIGS. 35A through 35C, the optical link assembly 172 comprises an elongated rectangular substrate assembly 183 shown in FIGS. 36A through 36C, and a cap 184 which covers the substrate assembly 183.

The substrate assembly 183 comprises a plated printed circuit assembly 187 which is mounted with a photodiode 185 and an IC chip 186, and an auxiliary substrate 188 which is adhered on the plated printed circuit assembly 187. Concave parts 183a through 183d are formed at the four corners of the substrate assembly 183 due to the provision of cutouts formed at the four corners of the auxiliary substrate 188. A concave part 183e is formed on the right of the substrate assembly 183 due to the provision of a cutout formed on the right side of the auxiliary substrate 188. A concave part 183f is formed on the upper surface of the substrate assembly 183 due to the provision of a penetrating hole in the auxiliary substrate 188, and an electronic part accommodating part 183g is formed on the upper surface of the substrate assembly 183 due to the provision of a penetrating window formed in the auxiliary substrate 188.

The cap 184 which supports a spherical lens 189 is positionally restricted similarly as in the case of the previously described modification. In other words, as shown in FIGS. 35A through 35C, a projecting part 184a of the cap 184 fits into the concave part 183f, and the cap 184 is positionally restricted in the radial direction about the concave part 183f. A projecting piece 184b fits into the concave part 183e, and the cap 184 is positionally restricted in the rotating direction. Cutouts 184c through 184f are formed at the corners of the cap 184, and the edges of the cutouts 184c through 184f slightly protrude within the respective concave parts 183a through 183d.

The optical link assembly 172 is positioned at four corners thereof since the concave parts 183a through 183d engage the positioning projections 179 through 182 as shown in FIG. 35A. Moreover, as shown in FIG. 32, the rear of the optical link assembly 172 is pushed by a cover 191 by way of a rubber plate 190, and the front of the optical link assembly 172 pushes against the stepped portions 177 and 178. With respect to the surface direction of the substrate assembly 183, it is seen from the enlarged view in FIG. 37 that edges 184c-1, 184c-2, . . . , 184f-1, and 184f-2 of the cutouts 184c through 184f in the cap make contact with the surfaces of the positioning projections 179 through 182. Hence, the optical link assembly 172 is mounted in a state positioned with respect to directions D and E in FIG. 37. The optical link assembly 172 is mounted so that the surface of the plated printed circuit assembly 187 is perpendicular to an axis $l_2$ of the main receptacle body 171. The axis $l_2$ coincides with an optical axis of an optical fiber (not shown) within the optical plug 200 which is connected to the receptacle assembly 170.

When positioning the optical link assembly 172, it is of course possible to use the concave parts 183a through 183d of the substrate assembly 183.

In the receptacle assemblies 111 and 170, the terminals 148 and 192 are fixed to the substrate of the respective optical link assemblies 114 and 172 and extend in a direction which coincides with the surface of the substrate of the optical link assemblies 114 and 172, although the illustration thereof is omitted. The terminals 148 and 192 extend through respective comb shaped cutouts 167 and 193 shown in FIGS. 22 and 34, in a hanging manner with respect to the receptacle assemblies 111 and 170.

Further, the present invention is not limited to these embodiments, but various variations and modifications may be made without departing from the scope of the present invention.

What is claimed is:

1. An optical transmitting and/or receiving module comprising:

an optical plug comprising a housing which is provided with at least one ferrule assembly having an optical fiber therein;

a main receptacle body connected to said optical plug; and an optical link assembly comprising a substrate, said substrate having at least one optical semiconductor element and circuit elements for signal processing fixed thereon, said optical link assembly being fixed to said main receptacle body so that said at least one optical semiconductor element opposes a tip end of the optical fiber of said optical plug and a surface of said substrate is perpendicular to an optical axis of said optical fiber, said optical link assembly comprising a positioning hole in said substrate, said main receptacle body comprising an accommodating part for accommodating said optical link assembly and a positioning pole which projects into said accommodating part, said optical link assembly being positioned by an engagement of said hole and said positioning pole and being fixed within said accommodating part.

2. An optical transmitting and/or receiving module as claimed in claim 1 in which said optical link assembly comprises terminals each having one end thereof fixed to said surface of said substrate and extending parallel to said surface, said terminals extending perpendicularly with respect to a lower surface of said main receptacle body.

3. An optical transmitting and/or receiving module comprising:

an optical plug comprising a housing which is provided with at least one ferrule assembly having an optical fiber therein;

a main receptacle body connected to said optical plug; and an optical link assembly comprising a substrate, said substrate having at least one optical semiconductor element and circuit elements for signal processing fixed thereon, said optical link assembly being fixed to said main receptacle body so that said at least one optical semiconductor element opposes a tip end of the optical fiber of said optical plug and a surface of said substrate is perpendicular to an optical axis of said optical fiber, said substrate of said optical link assembly having a rectangular shape, said substrate having cutouts formed at four corners thereof, said main receptacle body comprising an accommodating part for accommodating said optical link assembly and projections formed at four corners of said accommodating part, said projections being in correspondence with said cutouts, said optical link assembly being positioned at four corners thereof by engagements of said cutouts and said projections and being fixed within said accommodating part.

4. An optical transmitting and/or receiving module comprising:

an optical plug comprising a housing which is provided with at least one ferrule assembly having an optical fiber therein;

a main receptacle body connected to said optical plug; and an optical link assembly comprising a substrate, said substrate having at least one optical semiconductor element and circuit elements for signal processing fixed thereon, said optical link assembly being fixed to said main receptacle body so that said at least one optical semiconductor element opposes a tip end of the optical fiber of said optical plug and a surface of said substrate is perpendicular to an optical axis of said optical fiber, said optical link assembly comprising at least one lens fixed to a position opposing said at least one optical semiconductor element and conductive cap means mounted on said substrate so as to cover said at least one optical semiconductor element and said circuit elements, said substrate having a concave part and a cutout formed at mutually separated positions, said cap means having a projecting part and a projecting piece respectively in correspondence with said concave part and said cutout, said cap means being positioned by an engagement of said projecting part and said concave part and an engagement of said projecting piece and said cutout and being fixed to said substrate.

5. An optical transmitting and/or receiving module comprising:

an optical plug comprising a housing which is provided with at least one ferrule assembly having an optical fiber therein;

a main receptacle body connected to said optical plug; and an optical link assembly comprising a substrate, said substrate having at least one optical semiconductor element and circuit elements for signal processing fixed thereon, said optical link assembly being fixed to said main receptacle body so that said at least one optical semiconductor element opposes a tip end of the optical fiber of said optical plug and a surface of said substrate is perpendicular to an optical axis of said optical fiber, said ferrule assembly comprising a ferrule having a stopping part on a rear end thereof, a helical coil spring having one end thereof in contact with said stopping part, and a washer for stopping the other end of said helical coil spring, said housing having a groove for accommodating said helical coil spring, said ferrule assembly being mounted within said housing so that mutually opposing surfaces of said groove stops said stopping part and said washer and said helical coil spring is compressed between said stopping part and said washer.

6. An optical transmitting and/or receiving module comprising:

an optical plug comprising a housing which is provided with at least one ferrule assembly having an optical fiber therein;

a main receptacle body connected to said optical plug; and an optical link assembly comprising a substrate, said substrate having at least one optical semiconductor element and circuit elements for signal processing fixed thereon, said optical link assembly being fixed to said main receptacle body so that said at least one optical semiconductor element opposes a tip end of the optical fiber of said optical plug and a surface of said substrate is perpendicular to an optical axis of said optical fiber, said at least one optical semiconductor element including a light receiving element and a light emitting element, said circuit elements comprising first circuit elements provided with respect to said light receiving element and second circuit elements provided with respect to said light emitting element, said optical link assembly comprising a conductive cap integrally made up of a first cap part and a second cap part, said cap being fixed on said substrate so that said first cap part covers said light receiving element and said first circuit elements and said second cap part covers said light emitting element and said second circuit elements.

7. An optical transmitting and/or receiving module comprising:

an optical plug comprising a housing which is provided with at least one ferrule assembly having an optical fiber therein;

a main receptacle body connected to said optical plug; and an optical link assembly comprising a substrate, said substrate having at least one optical semiconductor element and circuit elements for signal processing fixed thereon, said optical link assembly being fixed to said main receptacle body so that said at least one optical semiconductor element opposes a tip end of the optical fiber of said optical plug and a surface of said substrate is perpendicular to an optical axis of said optical fiber, said at least one optical semiconductor element including a light receiving element and a light emitting element located in a first plane, said optical link assembly comprising first and second lenses respectively opposing said light receiving element and said light emitting element and having centers thereof located in a second plane which is parallel to said first plane, said first and second lenses having mutually different focal lengths, said optical plug comprising a pair of ferrule assemblies respectively having a first optical fiber and a second optical fiber, said first optical fiber having an end surface opposing said light receiving element, said second optical fiber having an end surface opposing said light emitting element.

* * * * *